United States Patent [19]

Thelin

[11] Patent Number: 4,897,093

[45] Date of Patent: Jan. 30, 1990

[54] FOAM-DESTROYING PROCESS

[76] Inventor: Ramona Thelin, 5326 N. Bosart, Indianapolis, Ind. 46220

[21] Appl. No.: 202,301

[22] Filed: Jun. 6, 1988

[51] Int. Cl.$^4$ ............................................ B01D 47/00
[52] U.S. Cl. ........................................... 55/87; 55/178
[58] Field of Search ............ 55/87, 128, 467, 470–473; 426/523; 99/485

[56] References Cited

U.S. PATENT DOCUMENTS 1,847,648  3/1932  Harkom .................................. 55/178

FOREIGN PATENT DOCUMENTS 2051526  5/1971  Fed. Rep. of Germany ........ 55/178

Primary Examiner—Bernard Nozick
Attorney, Agent, or Firm—Robert A. Spray

[57] ABSTRACT

A process for improving procedures such as cooking a liquid by blowing a moving airstream against and sweeping over the surface of a liquid, effecting and bursting of bubbles of foam or froth to destroy their disadvantageous buildup, and thus permitting more rapid heating without the bothersome "boilover" which occurs upon rapid heating, causing mess, waste, danger, odor, etc.

1 Claim, 1 Drawing Sheet

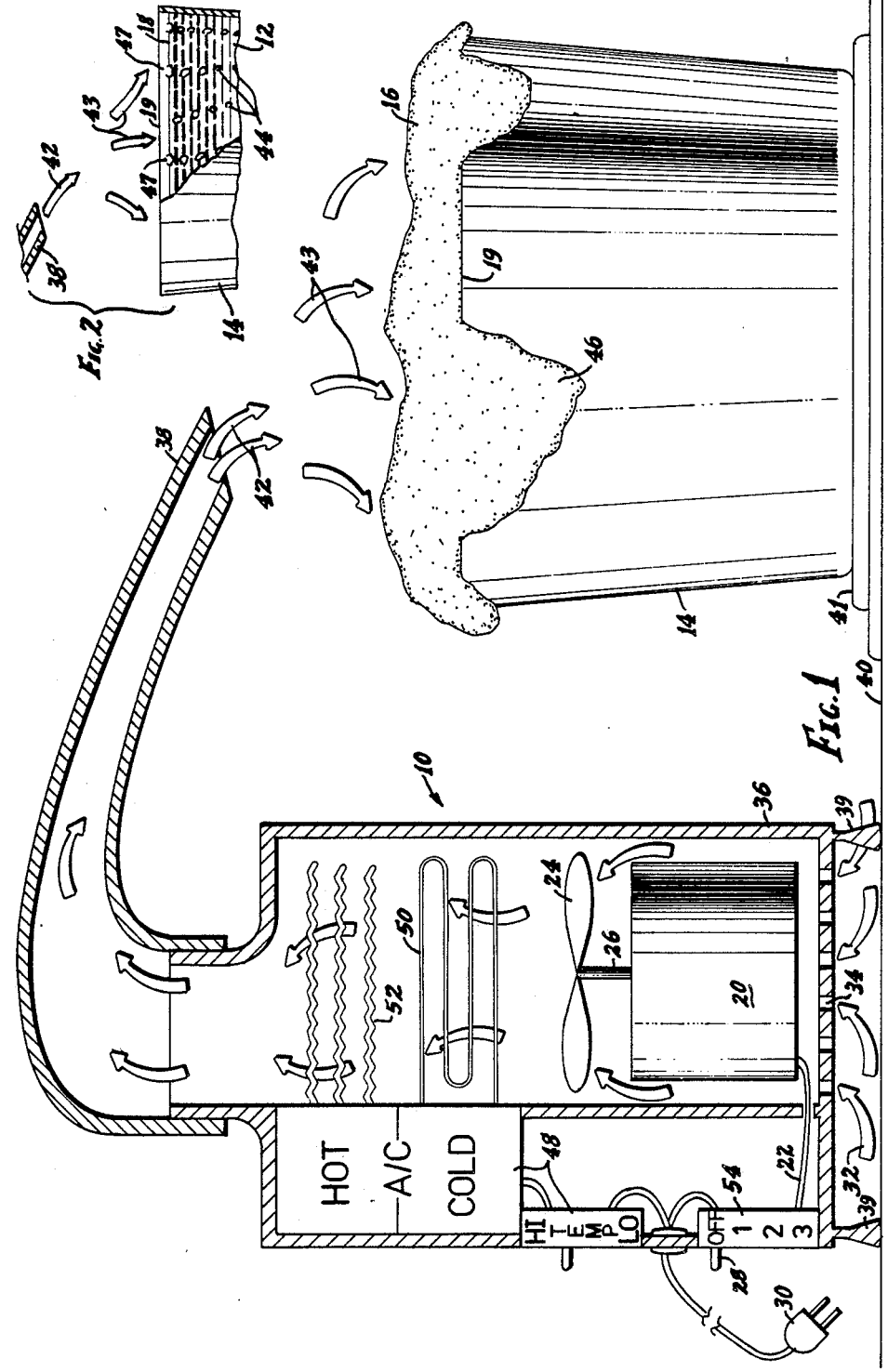

FOAM-DESTROYING PROCESS

FIELD AND BACKGROUND OF THE INVENTION

The present invention relates to liquid-treating procedures such as the cooking or other treatment of liquids which has an effect of causing an unwanted and disadvantageous amount of foaming or frothing of the liquid.

More particularly, the present invention relates to and provides a process for destroying the foam particles as they arise to the surface of the liquid, thus permitting more rapid heating of the liquid without the disadvantages of the occurrence of undue foam.

Such disadvantages, which occur when the foam or froth accumulates to any significant amount are chiefly the happening of things such as boilover of the hot liquid and foam, i.e., a boiling so vigorous that portions of the accumulated foam rise over the top walls of the container and fall down onto the associated heating element.

Such boilover causes waste, danger, messiness, etc., as is so well known that most attendants of such procedures the world over surely try to avoid it by slowing down the heating.

Without attempting to assert any precise knowledge as to the scientific nature of details of boiling a liquid which tends to cause the disadvantageously undue amount of foaming or frothing upon heating, the inventor suggests that probably vigorous boilover occurs due to the accumulation of such a thick layer of foam or broth that it acts like an insulator, which although probably improving thermal efficiency by retaining the heat, the heat-retention is so much that the boiling occurs fast and so vigorously, and with hardly any warning to the attendant, that the foam or broth is propelled upwardly and over the container wall, in clumps or masses, perhaps due partly to the size of the bubbles arising to the top of the liquid and partly to the rapidly built-up thickness of the foam or froth covering the surface of the liquid.

Whether or not that explanation is fully and precisely accurate from a scientific standpoint, the problem itself is accurately stated and well-known, i.e., that the cooking or heating of many liquids causes a very disadvantageous boilover unless heated so slowly as to be wasteful of time and effort, and that the boilover is bothersome, messy, wasteful, causes odors, is dangerous, etc.

SUMMARY OF THE INVENTION

In accordance with the present inventive concepts, there is provided an economical process for preventing foamy boilovers, by the advantageous procedure of flowing an air stream over and directed at the full liquid surface, such that the air stream impinges the foam and sweeps over the region of the liquid surface, destroying the bubbles of foam or froth as they appear on the surface after rising up through the liquid being treated.

In certain embodiments, means are provided also for the change of temperature of the air stream relative to that of the ambient air used for the air stream; and controls may be provided for optionally controlling the speed of the air stream.

No foam or froth is thus permitted to accumulate, and thus no insulating layer is formed, and more significantly no chunks or masses of frothy foam are present to be hurled outwardly of the container, for the bubbles individually burst as they emerge to the surface of the liquid.

There may be relative disadvantages, as may be conceded, such as perhaps a lower thermal efficiency, which in a sense is inherently wasteful, but this seems more than offset by the avoidance of the ingredient-wasteful and bothersome boilover, and the time-wasteful attempted solution of unduly slow heating.

Also as an introductory concession, it is expressly mentioned that it is not asserted that this process will work with all liquids; for if the liquid were quite viscous or rubber-like of consistency, e.g., it seems quite possible that factors such as high surface tension or the like would cause the bubbles emerging to the liquid surface to not burst, or not burst with sufficient rapidity to achieve the non-boilover characteristic which is involved in the present invention.

Further as to conceding a lack of an assertion of precise scientific explanation here, it is not asserted just what all is the phenomena which gives the air stream its beneficial effects, although, looking backwards to the foam-destruction achievement, it seems quite plausible that the phenomena is an accumulative complex of cooling and mechanical agitation, and perhaps other factors, which combine to cause prompt rupture of the thin walls of the individual bubbles of foam or froth.

The rupturability of the bubble walls seems logically to be a function of their fragility, which seems logically to be a function of their surface tension, the wall thickness, the bubble size, the nature of the liquid, etc., which are factors of the liquid and the treatment process; and since the rupturability seems likely to also involve the temperature difference between that of the liquid and the air stream, the amount of agitation the moving air stream causes, etc., the overall effect-explanation is admittedly speculative, not asserted to be precisely accurate.

Other factors might help contribute to the prompt break-up of bubbles, especially considering the thinness of their walls and the fact that the bubble will be collapsed by the rupture of even its weakest wall-portion; and such contributing factors, however slight, might also include such things as the extra drying effect of the moving air stream. A contributor to the overall bubble-bursting may even be the fact of the first set of bubbles coming from dissolved gases in contrast to vaporized liquid-portions; although, to the contrary, it may be that the extra heat being brought to the surface by the vaporized liquid portion in contrast to the probably cooler bubbles of released gas may contribute. Perhaps also the cooling which is an incident of the increased drying may contribute to the bubble collapse.

Still continuing to look backward from the bubble-bursting or foam-destroying achievements of the invention to try to explain their operativity, another possible aspect is that the moving airstream may take advantage of the observable fact that the initial appearance of bubbles in a liquid being heated to the point of the beginning of boiling (or at least to the point of release of dissolved gas) is at discrete and spaced locations.

As mentioned, the inventor does not assert these explanatory factors as of scientific confidence, but merely to suggest factors which might contribute to the overall effect.

Nevertheless, the invention or discovery of the moving air stream, for destroying the foam bubbles as they appear onto the liquid surface, and in spite of some thermal inefficiency and in spite of limitations as to probably not being useful for certain liquids, has been found to be quite useful for many cooking situations otherwise bothersome, e.g., in cooking of rice, pasta products, etc.

And although speed and temperature controls may be provided, it has been found that for general household cooking use they are not necessary, and the speed of the moving air stream does not seem to be at all critical nor even need to be very high.

Moreover, although the lack of precise knowledge as to particular causation-factors may leave the user with some procedural uncertainty, such as what are the optionally-desired factors such as optimum distance between the airstream outlet and the liquid surface, airstream speed, and airstream temperature, and operational parameters such as how soon the blower must be energized after heating is started, and the identity and nature of fluids for which the procedure is not wholly or sufficiently effective to be worthwhile, nevertheless the procedure has been found to be not critical as to most factors, and a little experimentation in consideration of the variables and the probable contributory factors seems not unduly great in comparison to the benefits, and in most situations will take less effort than the learning of many procedures whose operativity factors are even better known.

THE PRIOR ART HAS TRIED OTHER FOAM-DESTROYING DEVICES

A Search of the prior art was made in the U.S. Patent Office after this invention was made and during consideration as to a patenting attempt.

The Search showed only a single reference considered even close enough in overall goal to cite, that reference being the old (1923) U.S. Pat. No. 1,449,114, granted Mar. 20, 1923, to Friederich Hayduck; but as now to be mentioned, it was intentionally so different in both concept and operativity features from the device and operativity of the present invention that the Hayduck patent must be considered as teaching away from the present invention rather than teaching or making the present invention obvious.

Indeed, the Hayduck patent text expressly asserts that the device must be constructed such that an extremely high velocity is needed to be imparted to the foam, the Hayduck text saying that the best foam-destruction "only results" from extremely high speed air flow, even "up to about 12,000 to 18,000 meters per minute" (p. 2, lines 29-32); and that lesser speeds, even centrifugally impelled to be as high as from 2,000 to 3,000 meters per minute, are not sufficient.

Moreover the Hayduck patent directs the air stream into a side chamber into which the foam somehow gets, and the air stream is projected from within the expected zone or layer of foam, rather than projected above the foam per the present invention; and, according to the Hayduck text, the air stream is effective only to the extent that the foam becomes entrained in the extremely high velocity air stream such that the foam particles impact at an extremely high velocity against the interior wall of the side chamber, the need for the high velocity impact being strongly emphasized repeatedly in the Hayduck text, e.g., p. 1, lines 15, 27-40, 89-94; p. 2, lines 15, 18, 28-29, 54, and 98.

The Hayduck device also has the disadvantage, in comparison to the present invention, that the extremely high air speed requires means for attaining it, such as compressed air, or other suitable fluid under pressure sufficient to achieve the extremely high speed which the Hayduck device and its express text finds and asserts to be so very essential.

Further, the Hayduck device seems more complex than the device of the present invention.

Nevertheless, the Hayduck patent seems important in helping to show the inventive nature of the present invention, not only by the Hayduck device being so different in construction and operativity from the present invention, but because the Hayduck text documents the fact that for scores of years the prior art has realized and struggled with the problem of foaming and frothing during liquid-heating procedures of several types of liquids, and documents the fact that for at least 60 years other prior art has tried various types of mechanical and chemical means to obviate or prevent the formation of foam in various commercial industries in which the motivation for minimizing foaming of liquids being boiled or aerated would be especially a realistic goal.

Thus, the prior art in this field is not only acknowledged, it is emphasized, for it helps to show by its very existence and very long duration, that although the prior art has recognized the desire of an effective foam-destroying apparatus and procedure, the prior art has not provided nor suggested the simplified concepts which characterize the present invention, and by which this invention has been achieved; and more particularly, none of the prior art has achieved the particular and economical foam-destroying process of the present invention, with the advantageous construction and process concepts of the invention.

THE INVENTION'S COMPONENTS AND CONCEPTS ARE SIMILAR TO THOSE AVAILABLE IN THE PRIOR ART, EXCEPT FOR THE PRESENT CONCEPTS IN PARTICULAR

In a hindsight consideration of the present invention to determine factors of its inventive and novel nature, it is also not only conceded but emphasized that the prior art had details usable in this invention if the prior art had had the guidance of the present invention's concepts.

That is, it is emphasized that the prior art has had several particulars:

a. The prior art has had blowers and fans of many shapes and sizes;

b. The prior art has had blowers and fans for various uses, such as for cooling, ventilation, object-movement, etc.;

c. Blowers and fans are commercial items, with sales competition;

d. Air movement, and blowers for achieving it, have long been provided in the general area of stoves for heating and boiling liquids, such as exhaust hoods over cooking stoves;

e. The prior art has had world-wide knowledge of the disadvantages of boilovers caused by foam accumulation;

f. The prior art uses attempts of minimizing or avoiding foam as a means of avoiding boilovers;

g. The field of this invention is simple and non-technical, known quite well to millions and millions of people for untold years;

h. All the millions of persons familiar with the problem are surely also familiar with the variety of fans and blowers; and i. Small fans, such as desk-top cooling fans, hair blowers, etc., are so readily accessible and economical that most all persons could procure one to have made this invention.

Accordingly, the various concepts and components are conceded and emphasized to have been widely known in the prior art in many devices, even blowers in the general region of cooking stoves; nevertheless, the prior art not having had the present concepts in a combination providing this means of attaining the goal of foam-destruction, even only a fair amount of realistic humility, to avoid consideration of this invention improperly by hindsight, requires the concepts and achievement here of the apparatus and process to be realistically viewed as inventive in their nature.

The above description of the novel and advantageous foam-destroying process is of somewhat introductory and generalized form. More particular details, concepts, and features are set forth in the following and more detailed description of an illustrative embodiment, taken in conjunction with the accompanying drawings, which are of somewhat schematic and diagrammatic nature for showing of the inventive concepts of the present invention.

BRIEF DESCRIPTION OF THE DRAWINGS

In the drawings:

FIG. 1 of the drawings is a composite view, illustrating the foam-destroying device and procedure of the present invention, the device shown generally in vertical cross-section resting on a stove surface, with a foamable liquid in an open container resting on a heating element of the stove, and illustrating the location of the air-stream outlet above the liquid surface and above any foam thereon.

FIG. 2 is a fragmental view of the device and the liquid container, in smaller scale, illustrating somewhat schematically the operational procedure in which the foam-destroying device has been energized, blowing a foam-destroying steam of air at the surface of the foamable liquid from a time considerably prior to the time the massiveness of foam would have appeared as illustrated in FIG. 1, and thus not of the composite nature of FIG. 1 in that respect.

DETAILED DESCRIPTION OF PREFERRED EMBODIMENT OF THE INVENTION

The present invention is presented here as using a device 10 for accomplishing a desired foam-destroying function for destroying foam or froth of liquid 12 in an associated container 14, and the process is quite advantageous.

In an understanding of the invention as a process, as shown in the accompanying drawings, it is assumed that the liquid is involved in a procedure in which the liquid 12 is being treated in the container 14 such that a substantial amount of foam or froth 16 would be produced by the treatment and generally cover the surface 18 of the liquid 12, above the container rim 19.

The device 10 provides, for the process of this invention a blower means here shown as a motor 20 which when energized by a power cord 22 causes a fan or blower element 24 carried on a shaft 26 to revolve. Suitable switching and a power plug are indicated respectively at 28 and 30.

When energized, the blower element 24 draws in ambient air 32 through inlets 34 of the casing 36, and propels the air upward of the casing 36, where the blower means 10 is provided with an outlet means 38.

Suitable support means here shown as merely legs 39 are provided, and it is to be noted (FIG. 1) that with the legs 39 supporting the casing 36 on the surface 40 of the associated stove having the heater element 41 which is supporting and heating the liquid container 14, this illustrates the convenient and economical means for supporting the blower means 10 and its outlet means 38 such that a stream of air 42 as dispensed by the blower means 10 out the outlet means 38 will act as an air stream 43 to operatively impinge upon and sweep fully over the region of the surface 18 of the liquid 12 being treated, as indicated schematically by the drawings; but it is to be noted that certain factors should be realized as to the nature of the drawings, and the uncertainty of constituent effects or operativity explanations.

FIG. 1 is quite composite in nature as now mentioned.

That is, FIG. 1 is of composite nature in that the container and its liquid in this FIG. 1 are shown if in a procedure in which the foam-destroying device would not be used; although the foam-destroying device is shown in a procedure in which it is being used, even though when the foam-destroying device is being used, there would not be the mass of foam as shown. (It would not be recommended that the user wait until the massive foam condition of the liquid in FIG. 1 had happened, before energizing the foam-destroying device.)

Also the illustration in FIG. 1 is of composite nature in that it shows an embodiment having not only an air blower means, but also a heating and a cooling means and a control for achieving any of optional speeds of the foam-destroying air stream (schematically) as may be desired, although not considered necessary for usual kitchen use.

With that reminder noted, it is to be noted in the drawings that FIG. 2 schematically indicates bubbles 44 rising from discrete points as the liquid 12 is being heated, and the impingment of the stream of air stream 43 against the region of the surface 18 of the associated liquid 12 is operative to destroy the bubbles 44 of foam or froth as they rise to the surface 18 of the liquid 12.

This achieves the desired goal of permitting rapid heating of the liquid 12 by preventing the build-up of foam or froth 16 on and above the surface 18 of the liquid 12, thus avoiding the over the rim boilover condition 46 indicated diagrammatically in FIG. 1, by breaking up bubbles 44 as shown diagrammatically by the bursted surface bubbles 47 in FIG. 2.

For certain uses, there is also shown provided means 48 for changing the temperature of the air stream 42 being dispensed out the outlet means 38, either cooling and/or heating it as indicated schematically by cooling coils 50 and heating coils 52 respectively.

Further as an optional extra control, there is also shown diagrammatically as provided means 54 for controlling the speed of the air stream 42 being dispensed out the outlet means 38.

Considered particularly the advantageous process for destroying foam or froth appearing as bubbles 44 rising to the surface of the liquid 12 being treated, it is assumed that the liquid-treating is a procedure in which the liquid being treated in the associated container 14 is such that a substantial amount of the foam 16 and consequent boilover 46 would happen; and thus the process of providing an air stream 43 to impinge against the region of the liquid surface 18, and particularly to be noted diagrammatically as flowing or sweeping over the fullness of the liquid surface 18, achieves the bursting or break-up 47 of bubbles 44 appearing on the liquid surface 18, avoiding foam 16 accumulation and boilover, permitting more rapid heating of the liquid 12, etc.

BRIEF OPERATIONAL REVIEW

The concepts of the provision of a moving air stream for the attainment of the break-up of the bubbles, which otherwise accumulate to cause a disadvantageous bulk of foam which leads to the undesired boilover of foamy masses, has already been explained, with respect to the inventive process and the apparatus by which it is practiced.

And since the cost of the small amount of power for the provision of the air stream can be considered as rather negligible in comparison to the disadvantages of boilover, it is recommended that the air stream be begun quite soon after the liquid-heating has begun.

Other options are similarly suggested to be provided on the side of more effectiveness, especially considering the relatively low cost of their provision, e.g., an air speed sufficiently high, a closeness of the device's air stream outlet to the liquid surface; and a little experimentation when encountering a liquid or liquid-treatment which is different than what is familiar to the attendant as to this moving air stream procedure, is easily and economically done, especially since there seems to be no close criticality to the procedural details.

Similarly some experimentation may be worthwhile as to temperature and for speed of the moving air stream; and although to be achieved optimally these factors might logically require consideration of the other factors (the foaminess nature and viscosity of the liquid, the distance of the outlet from the liquid surface, and perhaps even the height of the container rim in contrast to that of the liquid surface, etc.) an optimality of the factors seems not usually needed, since the overall effectiveness seems to not require criticality of details of the basic concept of a moving and fully-sweepover nature of the air stream provided.

CONCLUSION

It is thus seen that a foam-destroying process per the inventive concepts as herein set forth, provides novel concepts of a desirable and advantageous process yielding the advantages of a foam-destroying procedure, and is conceptually different from the prior art even though a goal of foam-destroying and various uses of fans and blowers as basic concepts have been known for years; yet significantly this particular combination of prior art has not been suggested by the prior art, this achievement being a substantial and advantageous departure from prior art, even though the prior art shows attempted foam-destruction for many years, by pneumatic means, and by slowing down the heating rate. And particularly is the overal difference from the prior art significant when the non-obviousness is viewed by a consideration of the subject matter as a whole, as integrally incorporating the features different from the prior art, in contrast to merely those details of novelty themselves, and further in view of the prior art teaching away from the particular concepts and features of the present invention.

In summary as to the nature of these advantageous concepts, their inventiveness is shown by novel features of concept of the process as shown here, in novel and advantageous combination, not only being different from all the prior art known, but because the achievement is not what is or has been suggested considering this as comprising components which individually are similar in nature to what is well known to most persons, and in a usefulness which could have been a full motivation to most persons who have ever experienced a foam-caused boilover, thus as possible creators of the present concepts surely most of the many millions of cooks and industrial liquid-treatment attendants for many years, the entire world over. No prior art has suggested the modifications of any prior art to achieve the novel concepts here achieved, with the various features providing ease and practically fool-proof operativity and effectiveness, there being relatively little criticality required in the use of the concepts even though minor experimentation may be needed as explained herein.

Accordingly, it will thus be seen from the foregoing description of the invention according to this illustrative embodiment, considered with the accompanying drawings, that the present invention provides new and useful concepts of a novel and advantageous foam-destroying process having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown. For example, the term "foam" as used herein is in the overall sense of all types of bubble-caused frothiness as appears on and over the surface of a liquid as being treated by heating or whatever is the procedure causing such bubbling.

I claim:

1. A process for destroying foam or froth appearing as bubbles rising to the surface of liquid being heated in an open container, in which a substantial amount of foam or froth is produced and generally cover the surface of the liquid;

comprising blowing a stream of gas from a blower through an outlet thereof and thereby the gas impinging upon and sweeping over the region of the surface of the liquid being heated, the impingement of the stream of gas against the region of the surface of the liquid being operative to destroy the bubbles of foam or froth as they rise to the surface of the liquid, thus permitting rapid heating of the liquid by preventing the build-up of foam or froth on and above the surface of the liquid.

* * * * *